United States Patent
Ohashi et al.

[11] Patent Number: 5,890,575
[45] Date of Patent: Apr. 6, 1999

[54] CONTROL APPARATUS FOR HYDRAULICALLY OPERATED VEHICULAR TRANSMISSION

[75] Inventors: Tatsuyuki Ohashi; Shoji Asatsuke; Tetsuya Mochizuki; Jiro Obinata, all of Saitama-ken, Japan

[73] Assignee: Honda Giken Kogyo Kabushiki Kaisha, Minato-ku, Japan

[21] Appl. No.: 800,387

[22] Filed: Feb. 14, 1997

[30] Foreign Application Priority Data

Feb. 20, 1996 [JP] Japan .................................. 8-031673

[51] Int. Cl.$^6$ .................................................. F16H 61/06
[52] U.S. Cl. .................. 192/87.13; 477/143; 477/156; 192/109 F
[58] Field of Search .............................. 192/87.13, 87.14, 192/87.15, 87.18, 87.19; 477/109 F, 143, 158, 156

[56] References Cited

U.S. PATENT DOCUMENTS

| | | | |
|---|---|---|---|
| 4,219,109 | 8/1980 | Ushijima et al. | 192/87.18 X |
| 4,395,927 | 8/1983 | Muller et al. | 475/127 |
| 4,722,251 | 2/1988 | Sumiya et al. | 477/143 |
| 4,932,282 | 6/1990 | Arisumi | 477/143 |
| 5,397,284 | 3/1995 | Matsumoto et al. | 477/150 |
| 5,547,437 | 8/1996 | Kamada et al. | 477/143 |
| 5,653,660 | 8/1997 | Tsukamoto et al. | 477/156 X |
| 5,707,316 | 1/1998 | Tanahashi et al. | 477/156 X |

FOREIGN PATENT DOCUMENTS

| | | |
|---|---|---|
| 0 317 936 A | 11/1988 | European Pat. Off. . |
| 0 668 455 A | 1/1995 | European Pat. Off. . |
| 121751 | 8/1989 | Japan . |
| 3-168471 | 7/1991 | Japan . |

*Primary Examiner*—Charles A. Marmor
*Assistant Examiner*—William C. Joyce
*Attorney, Agent, or Firm*—Amstrong, Westerman, Hattori, McLeland & Naughton

[57] ABSTRACT

A changeover valve (13) connected to a shift valve unit (12) via four oil passages L3–L6, and two pressure regulating valves ($14_1$, $14_2$) are provided. At speed changing when the changeover valve (13) is in a first (right) position, an off-going hydraulic clutch is connected to oil passage L3 to control its pressure drop by the pressure regulating valve ($14_1$) and an on-coming hydraulic clutch is connected to L5 to control its pressure rise by the pressure regulating valve ($14_2$). After completion of the speed changing, the changeover valve (13) is switched to a second (left) position. At speed changing when the changeover valve (13) is in the second position, an on-coming hydraulic clutch is connected to L4 to control its pressure rise by the pressure regulating valve ($14_1$) and an off-going hydraulic clutch is connected to the L6 to control its pressure drop by the pressure regulating valve (14). After completion of the speed changing, the changeover valve (13) is switched to the first position. After completion of the speed changing, oil at line pressure is supplied to the on-coming hydraulic clutch from the line pressure oil passage L2 without passing through the pressure regulating valves, and oil is discharged from the off-going hydraulic clutch without passing through the pressure regulating valves.

5 Claims, 5 Drawing Sheets

CONTROL APPARATUS FOR HYDRAULICALLY OPERATED VEHICULAR TRANSMISSION

BACKGROUND OF THE INVENTION

1. Field of the Invention

The present invention relates to a control apparatus for a hydraulically-operated vehicular transmission having hydraulic engaging elements, mainly for use in an automatic transmission for a motor vehicle.

2. Description of the Related Art

As this kind of control apparatus, there is known the following in Japanese Published Unexamined Patent Application No. 168471/1991. Namely, a pair of first and second pressure regulating valves are provided. The first pressure regulating valve is used exclusively for supplying hydraulic oil and the second pressure regulating valve is used exclusively for discharging hydraulic oil. Pressure rise (or pressure boosting) characteristics of a hydraulic engaging element on an engaging side to be engaged in carrying out speed changing are controlled by the first pressure regulating valve. Pressure drop (or pressure decrease) characteristics of a hydraulic engaging element on a disengaging side to be disengaged in carrying out speed changing are controlled by the second pressure regulating valve. Thus, there is an attempt to improve driver "feel" at the time of speed changing.

The pressure regulating valves of the above-described conventional control apparatus are, generally speaking, electronically-controlled with solenoid valves. Therefore, the regulating valves sometimes do not function normally due to a failure in an electronic control system.

In case the second pressure regulating valve does not function normally with the result that a hydraulic pressure (or a hydraulic oil pressure) of the hydraulic engaging element on the disengaging side is maintained at a high pressure, there will occur locking of the transmission due to simultaneous engagement of unintended gears. As a solution, in the above-described conventional control apparatus, the hydraulic oil is discharged from the hydraulic engaging element on the disengaging side without passing through the second pressure regulating valve at a lapse of a predetermined time from the start of speed changing, whereby the hydraulic pressure in the above-described hydraulic engaging element is forcibly decreased.

However, in the above-described conventional control apparatus, the hydraulic oil is supplied to a hydraulic engaging element on the engaging side through the first pressure regulating valve not only at the time of speed changing but also after the speed changing has been completed. Therefore, in case the hydraulic pressure in the hydraulic engaging element on the engaging side cannot be increased or boosted due to a functional abnormality in the first pressure regulating valve, the hydraulic pressure in the hydraulic engaging element on the engaging side cannot be boosted or increased and, therefore, the transmission will revert to a neutral condition.

Further, in the above-described conventional control apparatus, the hydraulic pressure in the hydraulic engaging element on the engaging side must be boosted by the first pressure regulating valve up to a line pressure. Therefore, the range of hydraulic pressure to be controlled becomes wider, and a delicate control of the hydraulic pressure in a transient region of engagement at a relatively low pressure becomes difficult.

In view of the above-described disadvantages, the present invention has an object of providing a control apparatus for a hydraulically operated vehicular transmission in which the transmission will not revert to a neutral condition even when a functional abnormality occurs in the pressure regulating valves, in which locking of the transmission due to simultaneous engagement of unintended gears can be prevented, and in which a delicate control of the hydraulic pressure in a transient region of engagement can be provided with a higher accuracy.

SUMMARY OF THE INVENTION

According to a first aspect of the present invention, the above and other objects are attained by a control apparatus for a hydraulically-operated vehicular transmission having hydraulic engaging elements, the apparatus comprising an oil supply pressure regulating valve (i.e., a pressure regulating valve for oil supply) for controlling pressure rise characteristics of a hydraulic pressure during speed changing in an on-coming hydraulic engaging element. The apparatus is characterized in that changeover means is provided for switching a connection of oil passages such that, after completion of speed changing, hydraulic oil pressurized at line pressure is supplied to the on-coming hydraulic engaging element without passing through the oil supply pressure regulating valve.

According to a second aspect of the present invention, there is provided a control apparatus for a hydraulically operated transmission having hydraulic engaging elements, comprising: an oil supply pressure regulating valve for controlling pressure rise characteristics of a hydraulic pressure during speed changing in an on-coming hydraulic engaging element to be engaged at speed changing; and an oil discharge pressure regulating valve (i.e., a pressure regulating valve for oil discharge) for controlling pressure drop characteristics of a hydraulic pressure during speed changing in an off-going hydraulic engaging element. The apparatus is characterized in that: changeover means is provided for switching a connection of oil passages such that, after completion of speed changing, hydraulic oil pressurized at line pressure is supplied to the on-coming hydraulic engaging element without passing through the oil supply pressure regulating valve, and that hydraulic oil is discharged from the off-going hydraulic engaging element without passing through the oil discharge pressure regulating valve.

In either of the first aspect and the second aspect of the present invention, after completion of the speed changing, the pressurized hydraulic oil at line pressure is supplied to the on-coming hydraulic engaging element without passing through the oil supply pressure regulating valve. Therefore, even if a functional abnormality affects the oil supply pressure regulating valve, the transmission will not revert to a neural condition. Further, since there is no need for boosting the on-coming hydraulic pressure in the hydraulic engaging element up to the line pressure by means of the pressure regulating valve, the pressure regulating valve may cover only the hydraulic pressure control within a limited hydraulic pressure range of a transient region of engagement. Therefore, a delicate hydraulic pressure control in the transient region of engagement can be conducted with a higher accuracy. The first aspect of the present invention can also be applied to a control apparatus in which speed changing is made by engaging another hydraulic engaging element aside from a hydraulic engaging element that has already been engaged. In this case, even if an abnormality occurs to the oil supply pressure regulating valve, the transmission will not return, after completion of speed changing, back to the state it occupied prior to the speed changing.

Further, according to the second aspect of the present invention, the hydraulic oil is discharged, after completion of speed changing, from an off-going hydraulic engaging element without passing through the oil discharge regulating valve. Therefore, even if a functional abnormality occurs to the oil discharge pressure regulating valve, there will occur no locking of the transmission due to simultaneous engagement of unintended gears. Although the effect of preventing the locking of the transmission is the same as in the above-described conventional control apparatus, the present invention is superior to the conventional one in that the occurrence of a neutral state of the transmission can be prevented and also that the control accuracy of the hydraulic pressure in the transient region of engagement can be improved.

It is desired, in order to prevent the occurrence of speed change shocks, that the switching of connecting oil passages by the changeover means after the completion of speed changing is carried out when the on-coming hydraulic engaging element has substantially been engaged whereby the slipping thereof has fallen below a predetermined value.

However, if a functional abnormality has already occurred in the pressure regulating valve at the time of speed changing, the hydraulic pressure in the on-coming hydraulic engaging element does not rise at the time of speed changing, with the result that the slipping sometimes will never fall below the predetermined value. In order to surely carry out the speed changing even in such a case, the connecting oil passages may be switched after a lapse of a predetermined time from the start of speed changing. More preferably, the connecting oil passages may be switched when one of the following conditions is satisfied, i.e., a condition that the slipping of an on-coming hydraulic engaging element has fallen below the predetermined value and a condition that the time of lapse from a start of speed changing is above the predetermined time.

If one of two pressure regulating valves is used exclusively for oil supply and the other is used exclusively for oil discharge, the hydraulic pressure in the pressure-regulated oil passage for oil supply whose pressure is regulated by the pressure regulating valve exclusively for oil supply has been boosted at the time of last speed changing, and the hydraulic pressure in the pressure-regulated oil passage for oil discharge whose pressure is regulated by the pressure regulating valve exclusively for oil discharge has been dropped at the time of the last speed changing operation. Therefore, it is necessary, before the next speed changing, to drop the hydraulic pressure in the pressure-regulated oil passage exclusively for oil supply so as to be prepared for the boosting in the next speed changing operation, and to boost the hydraulic pressure in the pressure-regulated oil passage exclusively for oil discharge so as to be prepared for the pressure drop in the next speed changing operation. It follows that, when the speed changing is made continuously at a short interval at a low temperature, the pressure drop in the pressure-regulated oil passage exclusively for oil supply and the boosting in the pressure-regulated oil passage exclusively for oil discharge cannot be made ready for the next speed changing operation, with the result that speed change shocks are likely to occur.

In order to eliminate this kind of disadvantage, the following arrangement may be made. Namely, a pair of first and second pressure regulating valves functioning as the oil supply pressure regulating valve and the oil discharge pressure regulating valve are provided. A changeover valve and a shift valve unit both functioning as the changeover means are provided. The changeover valve is arranged to be switchable between first and second switchover positions and, at speed changing of one of upshifting and downshifting, is switched from one switchover position that was in prior to the speed changing operation to the other switchover position after completion of the speed changing operation and, at the type of speed changing of the other of upshifting and downshifting, is switched from one switchover position that was in prior to the speed changing operation to the other switchover position during the speed changing operation. A first connecting oil passage to be connected, at a first switchover position of the changeover valve, to a first pressure-regulated oil passage whose pressure is regulated by the first pressure regulating valve is provided. A second connecting oil passage to be connected to the first pressure-regulated oil passage at a second switchover position of the changeover valve is provided. The first connecting oil passage is connected at the second switchover position to an oil discharge passage and the second connecting oil passage is connected at the first switchover position to an oil passage at line pressure. A third connecting oil passage to be connected, at the first switchover position of the changeover valve, to a second pressure-regulated oil passage whose pressure is regulated by the second pressure regulating valve is provided. A fourth connecting oil passage to be connected to the second pressure-regulated oil passage at the second switchover position of the changeover valve is provided. The third connecting oil passage is connected at the second switchover position to the oil passage at line pressure and the fourth connecting oil passage is connected at the first switchover position to the oil discharge passage. The shift valve unit is arranged to operate: to connect, at speed changing in which the changeover valve is switched from the first switchover position to the second switchover position after completion of speed changing, an off-going hydraulic engaging element to the first connecting oil passage and an on-coming hydraulic engaging element to the third connecting oil passage, respectively, during speed changing; to connect, at speed changing in which the changeover valve is switched from the second switchover position to the first switchover position after completion of speed changing, an off-going hydraulic engaging element to the fourth connecting oil passage and an on-coming hydraulic engaging element to the second connecting oil passage, respectively, during speed changing; to connect, in carrying out speed changing in which the changeover valve is switched at speed changing from the first switchover position to the second switchover position, an off-going hydraulic engaging element to the oil discharge passage and an on-coming hydraulic engaging element to the third connecting oil passage, respectively, after completion of speed changing; and to connect, at the time of speed changing in which the changeover valve is switched at speed changing from the second switchover position to the first switchover position, an off-going hydraulic engaging element to the oil discharge passage and a hydraulic engaging element to the second connecting oil passage, respectively, after completion of the speed changing operation.

In other words, according to this arrangement, between the first and the second pressure regulating valves, the one that functioned as the oil supply pressure regulating valve in the last speed changing operation will function in the next speed changing operation as the oil discharge pressure regulating valve. The one that functioned as the oil discharge pressure regulating valve in the last speed changing operation will function in the next speed changing operation as the oil supply pressure regulating valve. Therefore, the transmission can be held ready for the next speed changing operation while maintaining the hydraulic pressures in the first and the second pressure regulating oil passages to be regulated by the first and the second pressure regulating valves at the hydraulic pressures at the time of the last speed changing operation. The above-described disadvantages will therefore not occur.

In case the hydraulically operated vehicular transmission comprises at least four transmission trains for first through fourth speeds to be selectively established by respective hydraulic engaging elements, the following arrangement may be employed. Namely, the changeover valve is switched and held in the first switchover position at first and third speeds and is held in the second switchover position at second and fourth speeds. The shift valve unit is arranged to operate: to connect, at first speed, a first speed hydraulic engaging element for establishing a first speed transmission train to the second connecting oil passage; to connect, at second speed, the first speed hydraulic engaging element to the first connecting oil passage and a second speed hydraulic engaging element for establishing a second speed transmission train to the third connecting oil passage, respectively; to connect, at third speed, the second speed hydraulic engaging element to the fourth connecting oil passage and a third speed hydraulic engaging element for establishing a third speed transmission train to the second connecting oil passage, respectively; and to connect, at fourth speed, the third speed hydraulic engaging element to the first connecting oil passage and a fourth speed hydraulic engaging element for establishing a fourth speed transmission train to the third connecting oil passage, respectively.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
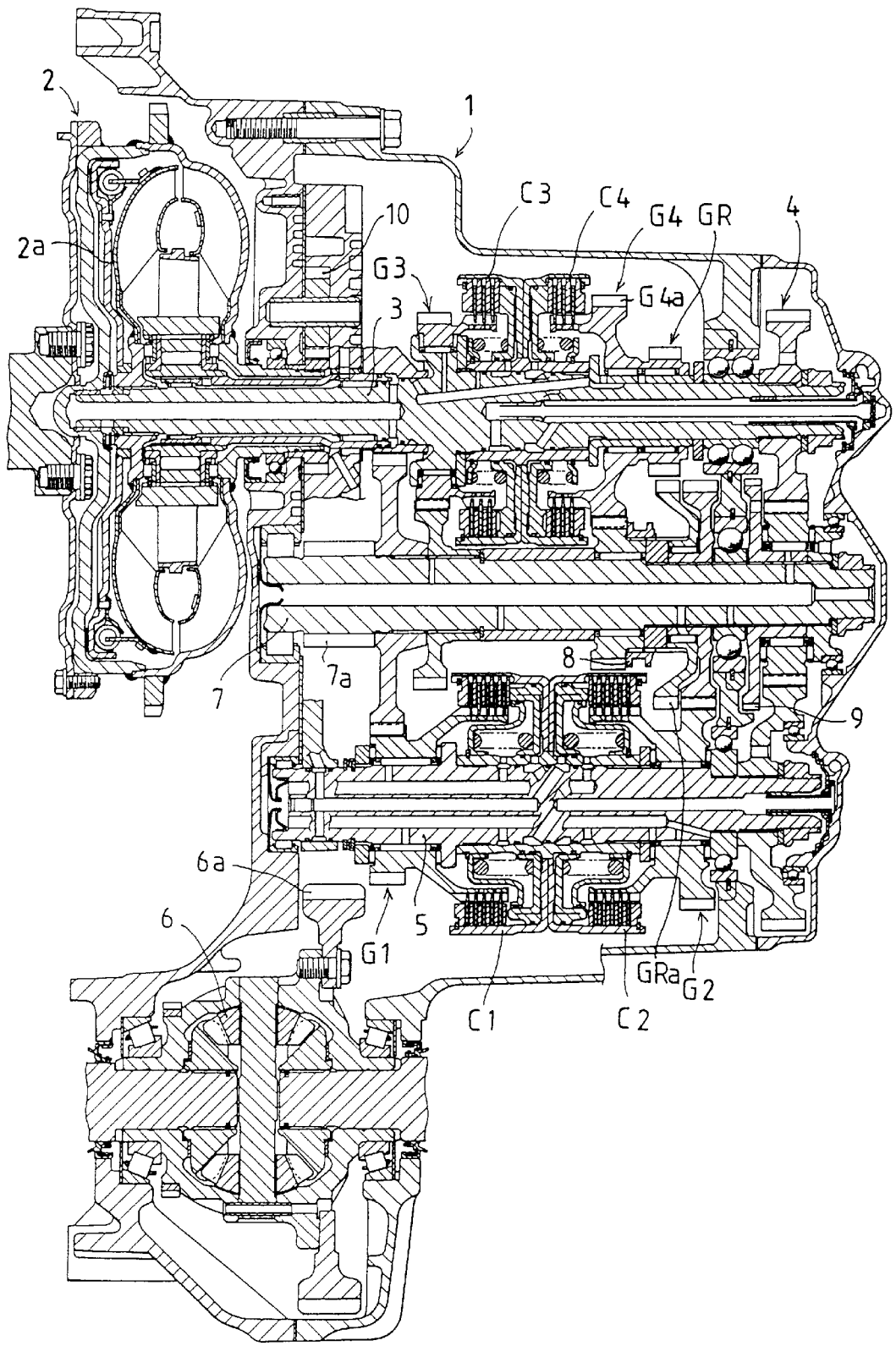
FIG. 1 is a cross-sectional view of a transmission to which the apparatus of the present invention is applied.

With reference to FIG. 1, numeral 1 denotes a hydraulically operated vehicular transmission for providing speed changing of four forward transmission trains and one reverse transmission train. The transmission 1 is provided with an input shaft 3 which is connected to an engine via a fluid torque converter 2; an intermediate shaft 5 which is always connected to the input shaft 3 via a gear train 4; and an output shaft 7 having a shaft end output gear 7a which is engaged with a final gear 6a on a differential 6 which is connected to driving wheels of a vehicle such as a motor vehicle. In the figure, the final gear 6a and the output gear 7a are illustrated in a manner separated from each other. This is because the figure is drawn in a development view, and both the gears 6a, 7a are actually in mesh with each other.

A first speed transmission train G1 and a second speed transmission train G2 are provided in parallel between the intermediate shaft 5 and the output shaft 7. A third speed transmission train G3, and a fourth speed transmission train G4 and a reverse transmission train GR are provided in parallel between the input shaft 3 and the output shaft 7. On the intermediate shaft 5 there are provided a first speed hydraulic clutch C1 and a second speed clutch C2, which are both defined as hydraulic engaging elements, interposed in the fist speed and the second speed transmission trains G1, G2, respectively. On the input shaft 5 there are provided a third speed hydraulic clutch C3 and a fourth speed hydraulic clutch C4, both of which are defined as hydraulic engaging elements, interposed in the third speed and the fourth speed transmission trains G3, G4, respectively. It is thus so arranged that, when each of the hydraulic clutches C1, C2, C3, C4 is engaged, the corresponding transmission train G1, G2, G3, G4 can be selectively established. The reverse transmission train GR is arranged to commonly use the fourth speed hydraulic clutch C4 with the fourth transmission train G4. By a switching (or changeover) operation of a selector gear 8 on the input shaft 7 between a forward running (or a forward drive) side on the left side as seen in FIG. 1 and a reverse running (or a reverse drive) side on the right side therein, the selector gear 8 is engaged with a driven gear G4a, GRa of the fourth speed transmission train G4 and the reverse transmission train GR, respectively. The fourth speed transmission train G4 and the reverse transmission train GR are thus selectively established. In the reverse transmission train GR, an idle gear (not illustrated) is interposed. Reference numeral 9 in the figure denotes a parking gear provided on the output shaft 7.

Figure 2:
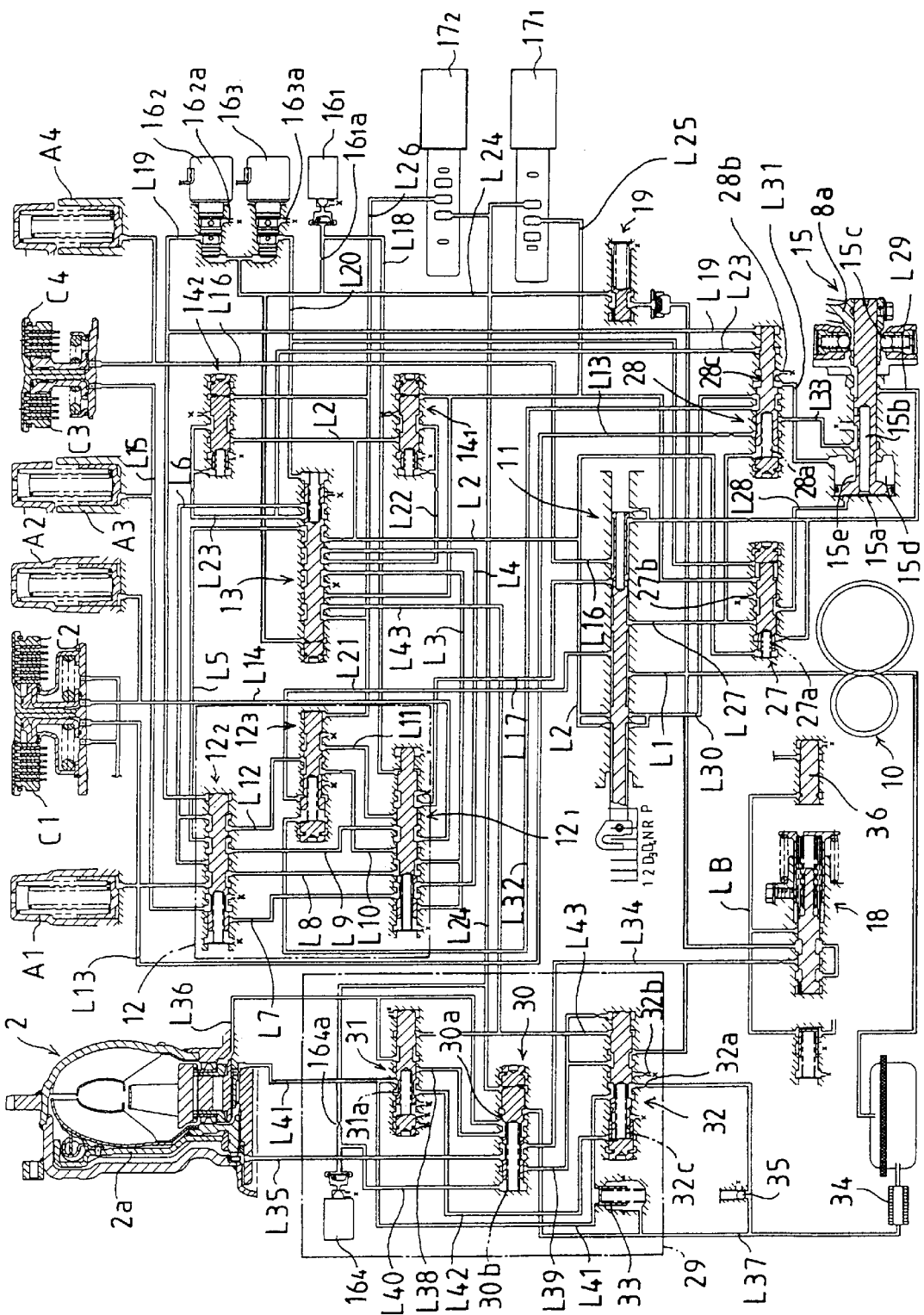
FIG. 2 is a diagram showing a hydraulic oil circuit of the transmission in FIG. 1.

Supply and discharge of hydraulic oil to and from each of the above-described hydraulic clutches C1–C4 are controlled by a hydraulic circuit as shown in FIG. 2. The hydraulic circuit is provided with a hydraulic pressure source 10 which is made up of a gear pump driven by the engine via a casing of the fluid torque converter 2; a manual valve 11 which is operated for switching in interlocking with a selector lever inside a vehicle compartment; a shift valve unit 12; a changeover valve 13 on an upstream side of the shift valve unit 12; a pair of first and second pressure regulating valves $14_1$, $14_2$ which are connected to the changeover valve 13; a servo valve 15 which switches between the forward running and the reverse running and to which is connected a fork 8a to be engaged with the selector gear 8; three sets of first through third solenoid valves $16_1$, $16_2$, $16_3$ for controlling to switch the shift valve unit 12 and the changeover valve 13; and a pair of first and second solenoid proportional valves $17_1$, $17_2$ for controlling to regulate the hydraulic pressure in the first and the second pressure regulating valves $14_1$, $14_2$. Reference numerals A1 through A4 denote accumulators provided to absorb sudden pressure changes in each of the hydraulic clutches C1 through C4, respectively.

The manual valve 11 is switchable to a total of seven positions, i.e., a parking position "P", a reverse position "R", a neutral position "N", an automatic speed changing position "$D_4$" for the first through the fourth speeds, an automatic speed changing position "$D_3$" for the first through the third speeds, a second speed retaining position "2", and a first speed retaining position "1".

Figure 3:
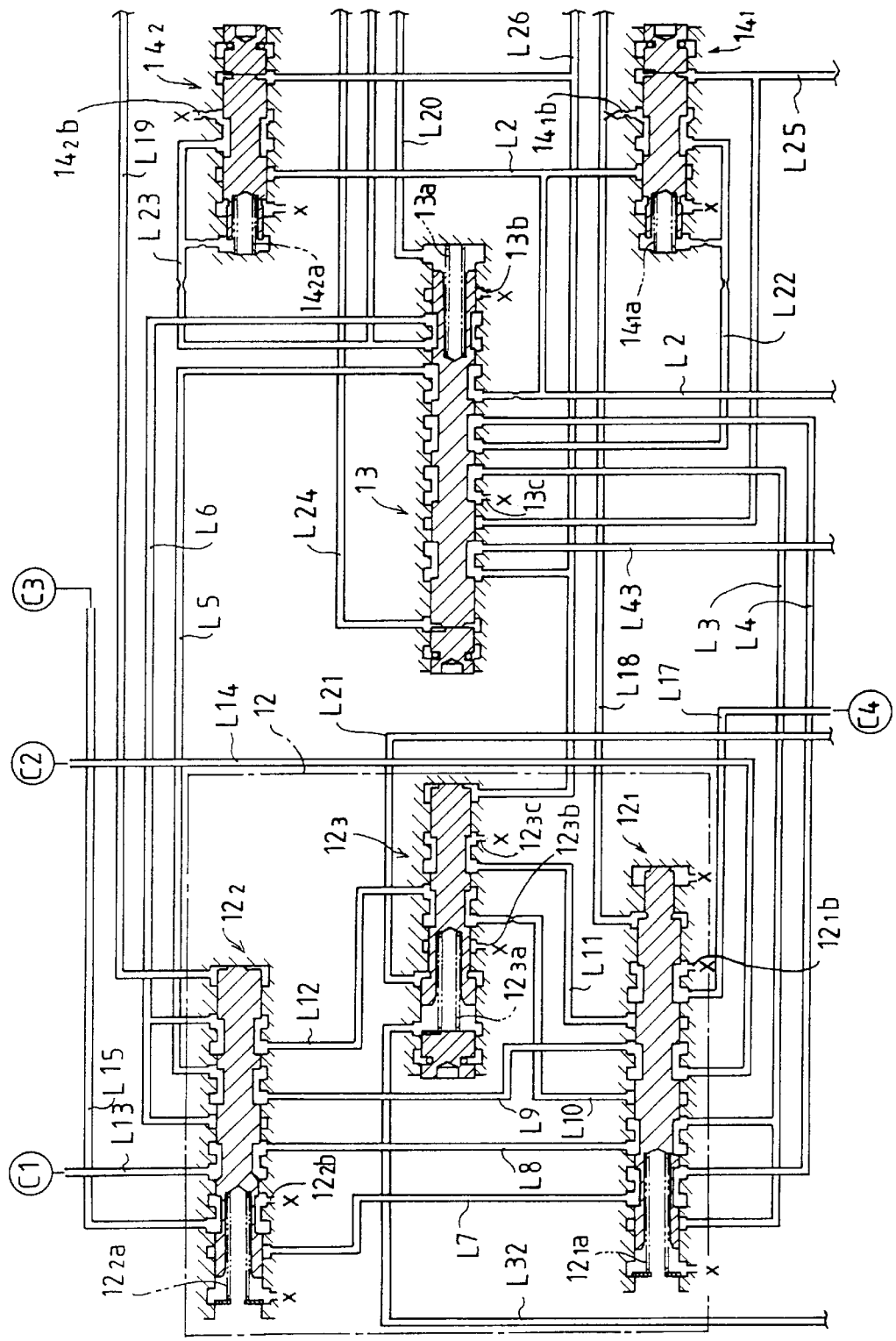
FIG. 3 is an enlarged diagram of an important portion of the hydraulic oil circuit.

In the "$D_4$" position of the manual valve 11, No. 1 oil passage L1 which is in communication with the hydraulic pressure source 10 is connected to No. 2 oil passage L2 which is in communication with the changeover valve 13. Pressurized hydraulic oil that has been regulated by a regulator 18 to a certain line pressure is supplied from No. 1 oil passage L1 to No. 2 oil passage L2. This pressurized oil is selectively supplied to the first speed through the fourth speed hydraulic clutches C1 through C4 via the changeover valve 13 and the shift valve unit 12 to thereby carry out the speed changing of the first speed through the fourth speed. Detailed explanations will be made hereinafter about the shift valve unit $12_1$ the changeover valve 13, and the pressure regulating valves $14_1$, $14_2$ with reference to FIG. 3.

The shift valve unit 12 is constituted by three sets of first through third shift valves $12_1$, $12_2$, $12_3$. The first shift valve $12_1$ is connected to the changeover valve 13 via two, i.e., No. 3 and No. 4, oil passages L3, L4. The second shift valve $12_2$ is connected to the changeover valve 13 via two, i.e., No. 5 and No. 6, oil passages L5, L6. The first and the second shift valves $12_1$, $12_2$ are connected to each other via three, i.e., No. 7 through No. 9, oil passages L7, L8, L9. Further, the third shift valve $12_3$ is connected to the first shift valve $12_1$ via two, i.e., No. 10 and No. 11, oil passages L10, L11 and is also connected to the second shift valve $12_2$ via No. 12 oil passage L12.

The first speed hydraulic clutch C1 is connected to the second shift valve $12_2$ via No. 13 oil passage L13. The second speed hydraulic clutch C2 is connected to the first shift valve $12_1$ via No. 14 oil passage L14. The third speed hydraulic clutch C3 is connected to the second shift valve $12_2$ via No. 15 oil passage L15. The fourth speed hydraulic clutch C4 is connected to the first shift valve $12_1$ via No. 17 oil passage L17 which is connected, in the "$D_4$", "$D_3$", "2" and "1" positions of the manual valve 11, to No. 16 oil passage L16 that is connected to the fourth speed hydraulic clutch C4.

The first shift valve $12_1$ is urged to the right position by a spring $12_1a$ and is also urged to the left position by the hydraulic pressure in No. 18 oil passage L18 which is controlled by the first solenoid valve $16_1$. The second shift valve $12_2$ is urged to the right position by a spring $12_2a$ and is also urged to the left position by the hydraulic pressure in No. 19 oil passage L19 which is controlled by the second solenoid valve $16_2$. The third shift valve $12_3$ is urged to the right by a spring $12_3a$ and is also urged to the left by the hydraulic pressure in No. 21 oil passage L21 which is connected to No. 1 oil passage L1 in a position of the manual valve 11 other than the "2" and "1" positions. In the "$D_4$" position of the manual valve 11, the third shift valve $12_3$ is held or retained in the left position by the line pressure to be inputted via No. 21 oil passage L21 so that No. 10 oil passage L10 is connected to an oil discharge port $12_3b$ of the third shift valve $12_3$, and No. 11 oil passage L11 and No. 12 oil passage L12 are connected together.

At the time of the first speed running (or the first speed drive) in the "$D_4$" position of the manual valve 11, the first shift valve $12_1$ is switched to the left position and the second shift valve $12_2$ is switched to the right position. According to these operations, No. 13 oil passage L13 for the first speed hydraulic clutch C1 is connected to No. 4 oil passage L4 which is defined as a second connecting oil passage to the changeover valve 13. At this time, No. 14 oil passage L14 for the second speed hydraulic clutch C2 is connected to that oil discharge port $12_3b$ of the third shift valve $12_3$ which is defined as an oil discharge passage, via the first shift valve $12_1$ and No. 10 oil passage L10. No. 15 oil passage L15 for the third speed hydraulic clutch C3 is connected to that oil discharge port $12_2b$ of the second shift valve $12_2$ which is defined as an oil discharge passage. No. 16 oil passage L16 for the fourth speed hydraulic clutch C4 is connected to No. 6 oil passage L6, which is defined as a fourth connecting oil passage to the changeover valve 13, via No. 17 oil passage L17, the first shift valve $12_1$, No. 11 oil passage L11, the third shift valve $12_3$, No. 12 oil passage $L12_1$, and the second shift valve $12_2$.

At the time of the second speed running, the first shift valve $12_1$ is switched to the right position while holding the second shift valve $12_2$ at the right position. According to these operations, No. 14 oil passage L14 for the second speed hydraulic clutch C2 is connected to No. 5 oil passage L5, which is defined as a third connecting oil passage to the changeover valve 13, via the first shift valve $12_1$, No. 9 oil passage L9, and the second shift valve $12_2$. No. 13 oil passage L13 for the first speed hydraulic clutch C1 is connected to No. 3 oil passage L3, which is defined as a first connecting oil passage to the changeover valve 13, via the second shift valve $12_2$, No. 8 oil passage L8, and the first shift valve $12_1$. At this time, No. 15 oil passage L15 for the third speed hydraulic clutch C3 is connected to the oil discharge port $12_2b$ of the second shift valve $12_2$ like at the time of the first speed running. No. 16 oil passage L16 for the fourth speed hydraulic clutch C4 is connected to that oil discharge port $12_1b$ of the first shift valve $12_1$ which is defined as a discharge oil passage, via No. 17 oil passage L17.

At the time of the third speed running, the second shift valve $12_2$ is switched to the left position while holding the first shift valve $12_1$ at the right position. According to these operations, No. 15 oil passage L15 for the third speed hydraulic clutch C3 is connected to No. 4 oil passage L4 via the second shift valve $12_2$, No. 7 oil passage L7 and the first shift valve $12_1$. No. 14 oil passage L14 for the second speed hydraulic clutch C2 is connected to No. 6 oil passage L6 via the first shift valve $12_1$, No. 9 oil passage L9 and the second shift valve $12_2$. At this time, No. 13 oil passage L13 for the first speed hydraulic clutch C1 is connected to the oil discharge port $12_2b$ of the second shift valve $12_2$. No. 16 oil passage L16 for the fourth hydraulic clutch C4 is connected to the oil discharge port $12_1b$ of the first shift valve $12_1$ via No. 17 oil passage L17, such as at the time of the second speed running.

At the time of the fourth speed running, the first shift valve $12_1$ is switched to the left position while holding the second shift valve $12_2$ at the left position. According to these operations, No. 16 oil passage L16 for the fourth speed hydraulic clutch C4 is connected to No. 5 oil passage L5 via No. 17 oil passage L17, the first shift valve $12_1$, No. 11 oil passage L11, the third shift valve $12_3$, No. 12 oil passage L12 and the second shift valve $12_2$. No. 15 oil passage L15 for the third speed hydraulic clutch C3 is connected to No. 3 oil passage L3 via the second shift valve $12_2$, No. 7 oil passage L7 and the first shift valve $12_1$. At this time, No. 13 oil passage L13 for the first speed hydraulic clutch C1 is connected to the oil discharge port $12_2b$ of the second shift valve $12_2$, such as at the time of the third speed running. No. 14 oil passage L14 for the second speed hydraulic clutch C2 is connected to the oil discharge port $12_3b$ of the third shift valve $12_3$ via the first shift valve $12_1$ and No. 10 oil passage L10, such as at the time of the first speed running.

To the changeover valve 13 there are connected: No. 2 oil passage L2 which is defined as an oil passage at a line pressure; No. 3 through No. 6 oil passages L3, L4, L5, L6 as the first through the fourth connecting oil passages; No. 22 oil passage L22 which is defined as a first pressure-regulated oil passage whose pressure is regulated by the first pressure regulating valve $14_1$; and No. 23 oil passage L23 which is defined as a second pressure-regulated oil passage whose pressure is regulated by the second pressure regulating valve $14_2$. The changeover valve 13 is urged to the right position, which is defined as a first switchover position, by a predetermined pressure lower than the line pressure (hereinafter called a modulator pressure) which is outputted to No. 24 oil passage L24 on the downstream side of a modulator valve 19 which is connected to No. 1 oil passage L1. The changeover valve 13 is urged to the left position, which is defined as a second switchover position, by a spring 13a and the hydraulic pressure in No. 20 oil passage L20 to be controlled by the third solenoid valve $16_3$.

When the changeover valve 13 is at the right position, No. 3 oil passage L3 is connected to No. 22 oil passage L22, and No. 5 oil passage L5 is connected to No. 23 oil passage L23. Therefore, it becomes possible to regulate the hydraulic pressure in each of No. 3 and No. 5 oil passages L3, L5 by the first and the second pressure regulating valves $14_1$, $14_2$, respectively. At this time, No. 4 oil passage L4 is connected to No. 2 oil passage L2, and No. 6 oil passage L6 is connected to that oil discharge port 13b of the changeover valve 13 which is defined as an oil discharge passage.

When the changeover valve 13 is in the left position, No. 4 oil passage L4 is connected to No. 22 oil passage L22, and No. 6 oil passage L6 is connected to No. 23 oil passage L23. Therefore, it becomes possible to regulate the hydraulic pressure in each of No. 4 and No. 6 oil passages L4, L6 by the first and the second pressure regulating valves $14_1$, $14_2$, respectively. At this time, No. 3 oil passage L3 is connected to that oil discharge port 13c of the changeover valve 13 which is defined as the oil discharge passage, and No. 5 oil passage L5 is connected to No. 2 oil passage L2.

At the time of the first speed in which the first shift valve $12_1$ is in the left position, the second shift valve $12_2$ is in the right position, and the first speed hydraulic clutch C1 is connected to No. 4 oil passage L4, the changeover valve 13 is switched and held in the right position, and No. 4 oil passage L4 is connected to No. 2 oil passage L2. In this way, the hydraulic pressure in the first speed hydraulic clutch C1 (hereinafter called a first speed pressure) becomes the line pressure, whereby the first speed transmission train G1 is established through the engagement of the first speed hydraulic clutch C1.

At the time of the second speed in which both the first and the second shift valves $12_1$, $12_2$ are in the right position, and the first speed hydraulic clutch C1 is connected to No. 3 oil passage L3, and the second speed hydraulic clutch C2 is connected to No. 5 oil passage L5, respectively, the changeover valve 13 is switched and held in the left position, No. 3 oil passage L3 is connected to the oil discharge port 13c, and No. 5 oil passage L5 is connected to No. 2 oil passage L2. In this manner, the first speed pressure is lowered to the atmospheric pressure to thereby release the engagement of the first speed hydraulic clutch C1. On the other hand, the hydraulic pressure in the second speed hydraulic clutch C2 (hereinafter called a second speed pressure) becomes the line pressure, whereby the second speed transmission train G2 is established through the engagement of the second speed hydraulic clutch C2.

At the time of upshifting from the first speed to the second speed, both the first and the second shift valves $12_1$, $12_2$ are first switched to the condition of the second speed while holding the changeover valve 13 in the position at the time of the first speed, i.e., in the right position. In this case, No. 3 and No. 5 oil passages L3, L5 to be connected to the first and the second speed hydraulic clutches C1, C2, respectively, are connected to No. 22 and No. 23 oil passages L22, L23, respectively. Therefore, it becomes possible to control the pressure drop characteristics of the first speed pressure by the first pressure regulating valve 141 and to control the pressure rise characteristics of the second speed pressure by the second pressure regulating valve 142, whereby a smooth upshifting from the first speed to the second speed can be carried out. After the speed changing has been completed, the changeover valve 13 is switched to the left position. Hydraulic oil is discharged from the first speed hydraulic clutch C1 without passing through the first pressure regulating valve $14_1$, and the second speed hydraulic clutch C2 is supplied with pressurized oil at the line pressure without passing through the second pressure regulating valve $14_2$.

At the time of downshifting from the second speed to the first speed, the changeover valve 13 is first switched from the position at the time of the second speed to the position at the time of the first speed, i.e., from the left position to the right position, while holding both the shift valves $12_1$, $12_2$ to the condition at the time of the second speed. According to these operations, such as at the time of upshifting from the first speed to the second speed, both the first speed and the second speed hydraulic clutches C1, C2 are connected to No. 22 and No. 23 oil passages L22, L23, respectively. Therefore, it becomes possible to control the pressure rise characteristics of the first speed pressure by the first pressure regulating valve $14_1$, and to control the pressure drop characteristics of the second speed pressure by the second pressure regulating valve $14_2$, whereby a smooth downshifting from the second speed to the first speed can be carried out. After the speed changing has been completed, both the first and the second shift valves $12_1$, $12_2$ are switched to the condition of the first speed running. The second speed hydraulic clutch C2 is connected to the oil discharge port $12_3b$ of the third shift valve $12_3$. The hydraulic oil is thus discharged from the second speed hydraulic clutch C2 without passing through the second pressure regulating valve $14_2$. The first speed hydraulic clutch C1 is supplied with the pressurized oil at the line pressure without passing through the first pressure regulating valve $14_1$ such as at the time of the first speed.

At the time of the third speed in which the first shift valve $12_1$ is in the right position, the second shift valve $12_2$ is in the left position, the second speed hydraulic clutch C2 is connected to No. 6 oil passage L6, and the third speed hydraulic clutch C3 is connected to No. 4 oil passage L4, respectively, the changeover valve 13 is switched and held in the right position. Such as at the time of the first speed running, No. 6 oil passage L6 is connected to the oil discharge port 13b and No. 4 oil passage L4 is connected to No. 2 oil passage L2. In this manner, the second speed pressure is lowered to the atmospheric pressure and the engagement of the second speed hydraulic clutch C2 is thereby released. On the other hand, the hydraulic pressure in the third speed hydraulic clutch C3 (hereinafter called a third speed pressure) becomes the line pressure, whereby the third speed transmission train G3 is established through the engagement of the third speed hydraulic clutch C3.

At the time of upshifting from the second speed to the third speed, both the first and the second shift valves $12_1$, $12_2$ are switched to the condition of the third speed while holding the changeover valve 13 in the position of the second speed running, i.e., in the left position. In this case, No. 4 and No. 6 oil passages L4, L6 to be connected to the third and the second speed hydraulic clutches C3, C2 are connected to No. 22 and No. 23 oil passages L22, L23, respectively. Therefore, it becomes possible to control the pressure rise characteristics of the third speed pressure by the first pressure regulating valve $14_1$ and to control the pressure drop characteristics of the second speed pressure by the second pressure regulating valve $14_2$. Therefore, a smooth upshifting from the second speed to the third speed can be carried out. After the speed changing has been completed, the changeover valve 13 is switched to the right position. The hydraulic oil is discharged from the second speed hydraulic clutch C2 without passing through the second pressure regulating valve $14_2$, and the third speed hydraulic clutch C3 is supplied with the pressurized oil at the line pressure without passing through the first pressure regulating valve $14_1$.

At the time of downshifting from the third speed to the second speed, the changeover valve 13 is first switched from the position at the time of the third speed to the position at the time of second speed, i.e., from the right position to the left position, while holding both the first and the second shift valves $12_1$, $12_2$ to the condition of the third speed. According to these operations, such as at the time of upshifting from the second speed to the third speed, both the third speed and the second speed hydraulic clutches C3, C2 are connected to No. 22 and No. 23 oil passages L22, L23, respectively. Therefore, it becomes possible to control the pressure drop characteristics of the third speed pressure by the first pressure regulating valve $14_1$, and to control the pressure rise characteristics of the second speed pressure by the second pressure regulating valve $14_2$, whereby a smooth downshifting from the third speed to the second speed can be carried out. After the speed changing has been completed, both the fist and the second shift valves $12_1$, $12_2$ are switched to the condition of the second speed and the third speed hydraulic clutch C3 is connected to the oil discharge port $12_2b$ of the second shift valve $12_2$. The hydraulic oil is thus discharged from the third speed hydraulic clutch C3 without passing through the first pressure regulating valve $14_1$ and the second speed hydraulic clutch C2 is supplied with the pressurized oil at the line pressure without passing through the second pressure regulating valve $14_2$ such as at the time of the second speed.

At the time of the fourth speed in which both the first and the second shift valves $12_1$, $12_2$ are in the left position, and the third speed hydraulic clutch C3 is connected to No. 3 oil passage L3, and the fourth speed hydraulic clutch C4 is connected to No. 5 oil passage L5, respectively, the changeover valve 13 is switched and held at the left position. Such as at the time of second speed, No. 3 oil passage L3 is connected to the oil discharge port 13c, and No. 5 oil passage L5 is connected to No. 2 oil passage L2. In this manner, the third speed pressure is lowered to the atmospheric pressure to thereby release the engagement of the third speed hydraulic clutch C3. On the other hand, the hydraulic pressure in the fourth speed hydraulic clutch C4 (hereinafter called a fourth speed pressure) becomes the line pressure, whereby the fourth speed transmission train G4 is established through the engagement of the fourth speed hydraulic clutch C4.

At the time of upshifting from the third speed to the fourth speed, both the first and the second shift valves $12_1$, $12_2$ are switched to the condition of the fourth speed while holding the changeover valve 13 in the position of the third speed, i.e., in the right position. In this case, No. 3 and No. 5 oil passages L3, L5 to be connected to the third and the fourth hydraulic clutches C3, C4 are connected to No. 22 and No. 23 oil passages L22, L23, respectively. Therefore, it becomes possible to control the pressure drop characteristics of the third speed pressure by the first pressure regulating valve $14_1$ and to control the pressure rise characteristics of the fourth speed pressure by the second regulating valve $14_2$. A smooth upshifting from the third speed to the fourth speed can thus be carried out. After the speed changing has been completed, the changeover valve 13 is switched to the left position. The hydraulic oil is discharged from the third speed hydraulic clutch C3 without passing through the first pressure regulating valve $14_1$. And the fourth speed hydraulic clutch C4 is supplied with the oil at the line pressure without passing through the second pressure regulating valve $14_2$.

At the time of downshifting from the fourth speed to the third speed, the changeover valve 13 is first switched from the position at the time of the fourth speed to the position at the time of the third speed, i.e., from the left position to the right position, while holding both the first and the second shift valves $12_1$, $12_2$ to the condition of the fourth speed. According to these operations, such as at the time of upshifting from the third speed to the fourth speed, the third speed and the fourth speed hydraulic clutches C3, C4 are connected to No. 22 and No. 23 oil passages L22, L23, respectively. Therefore, it becomes possible to control the pressure rise characteristics of the third speed pressure by the first pressure regulating valve $14_1$, and to control the pressure drop characteristics of the fourth speed pressure by the second pressure regulating valve $14_2$, whereby a smooth downshifting from the fourth speed to the third speed can be carried out. After the speed changing has been completed, both the first and the second shift valves $12_1$, $12_2$ are switched to the condition of the third speed. The fourth speed hydraulic clutch C4 is connected to the oil discharge port $12_1b$ of the first shift valve $12_1$. The hydraulic oil is thus discharged from the fourth speed hydraulic clutch C4 without passing through the second pressure regulating valve $14_2$. And the third speed hydraulic clutch C3 is supplied with the pressurized oil at the line pressure without passing through the first pressure regulating valve $14_1$.

At the time of the first speed running in which the first shift valve $12_1$ is in the left position, and the second shift valve $12_2$ is in the right position, the first speed hydraulic clutch C1 is connected to No. 4 oil passage L4, and the fourth speed hydraulic clutch C4 is connected to No. 6 oil passage L6. When the changeover valve 13 is switched to the left position to thereby connect No. 4 and No. 6 oil passages L4, L6 to No. 22 and No. 23 oil passages L22, L23, respectively, it becomes possible to control the first speed pressure and the fourth speed pressure by the first and the second pressure regulating valves $14_1$, $14_2$, respectively. When the manual valve 11 is switched from the "N" position to the "$D_4$" position, i.e., when the first speed transmission gear train G1 is established from the beginning at the so-called "in-gear" time (or at the time of initial gear engagement), a large driving force is suddenly transmitted to the driving wheels, thereby resulting in an occurrence of in-gear shocks. In such a case, at the time of initial gear engagement, if the fourth speed transmission train G4 is established first and then the first speed transmission train G1 is established, the starting up (or rising) of the driving force to be transmitted to the driving wheels becomes gradual, thereby alleviating the in-gear shocks. Therefore, the following arrangement is employed. Namely, at the time of initial gear engagement, both the shift valves $12_1$, $12_2$ are made to be in the condition of the first speed, and also the changeover valve 13 is moved to the left position. The fourth speed pressure is thus once boosted by the second pressure regulating valve $14_2$ and, then, the fourth speed pressure is decreased by the second pressure regulating valve $14_2$ while boosting the first speed pressure by the first pressure regulating valve $14_1$. Thereafter, the changeover valve 13 is switched to the right position to thereby discharge the hydraulic oil from the fourth speed hydraulic clutch C4 without passing through the second pressure regulating valve $14_2$, and the first speed hydraulic clutch C1 is supplied with the pressurized oil at the line pressure without passing through the first pressure regulating valve $14_1$, whereby the first speed hydraulic clutch C1 is completely engaged.

Each of the first and the second pressure regulating valves $14_1$, $14_2$ is urged by each of springs $14_1a$, $14_2a$ and by the hydraulic pressure in each of No. 22 and No. 23 oil passages L22, L23 to the rightward oil discharge side in which each of No. 22 and No. 23 oil passages L22, L23 is connected to each of the oil discharge ports $14_1b$, $14_2b$, respectively. Further, the first and the second pressure regulating valves $14_1$, $14_2$ are urged by the respective hydraulic pressures in No. 25 and No. 26 oil passages L25, L26 on the output side of each of solenoid proportional valves $17_1$, $17_2$ to the leftward oil supply side in which No. 22 and No. 23 oil passages L22, L23 are respectively connected to No. 2 oil passages L2. In this manner, the hydraulic pressure in each of No. 22 and No. 23 oil passages L22, L23 is increased or decreased in proportion to the output pressure of each of the solenoid proportional valves $17_1$, $17_2$. In order to decrease the speed change shocks, it becomes necessary to perform a delicate control of the hydraulic pressure in a transient region of engagement of the off-going hydraulic clutch and the on-coming hydraulic clutch. In this embodiment, after the completion of the speed changing operation, the supply of hydraulic oil to the on-coming hydraulic clutch and the discharge of hydraulic oil from the off-going hydraulic clutch are made without passing through the pressure regulating valves $14_1$, $14_2$. Therefore, the pressure regulating valves $14_1$, $14_2$ must bear the hydraulic pressure control only in the transient region of engagement at a relatively low hydraulic pressure. Therefore, the resolution of the pressure control can be made higher and the delicate control of the pressure rise characteristics of the on-coming hydraulic clutch and the pressure drop characteristics of the off-going hydraulic clutch can be performed with greater accuracy.

Modulator pressure is inputted into both the first and the second solenoid proportional valves $17_1$, $17_2$ via No. 24 oil passage L24. Here, as the first solenoid proportional valve $17_1$, there is used one in which an output pressure becomes maximum (modulator pressure) at the time of non-energization. As the second solenoid proportional valve $17_2$, there is used one in which the output pressure becomes minimum (atmospheric pressure) at the time of non-energization.

The first solenoid valve $16_1$ is formed by a two-way valve which opens to atmosphere No. 18 oil passage L18 which is connected to No. 24 oil passage L24 via a throttle $16_1a$. At the time of non-energization thereof, it is closed to thereby change the hydraulic pressure in No. 18 oil passage L18 to a high hydraulic pressure (modulator pressure).

Each of the second and the third solenoid valves $16_2$, $16_3$ is formed by a three-way valve which is switchable between an oil supply position in which No. 19 and No. 20 oil passages L19, L20 on the output side of the respective solenoid valves are connected to No. 24 oil passage L24, and an oil discharge position in which this connection is shut off and connect each of the oil passages L19, L20 to each of oil discharge ports $16_2a$, $16_3a$, respectively. At the time of non-energization thereof, it is switched to the oil supply position and change the hydraulic pressure in each of No. 19 and No. 20 oil passages L19, L20 to a high hydraulic pressure (modulator pressure).

The second and the third solenoid valves $16_2$, $16_3$ may be formed by a two-way valve like the first solenoid valve $16_1$. However, the two-way valve has disadvantages in that the amount of oil leakage when opened becomes large and that the control response becomes poor because, at a low temperature, there remains a residual hydraulic pressure even when it is opened. Here, at the time of low speed running at the first speed or at the time when the vehicle is stopped, the revolution speed of the engine is lowered so that the amount of oil supply from the hydraulic pressure source 10 decreases and, therefore, the oil leak amount must be minimized. In addition, at the first speed, since the second shift valve $12_2$ and the changeover valve 13 are moved to the right position, No. 19 and No. 20 oil passages L19, L20 must be made to the atmospheric pressure. If the second and the third solenoid valves $16_2$, $16_3$ are formed by two-way valves, the leak amount becomes excessive. In view of the above disadvantages and in view of the fact that the switching operation of the changeover valve 13 that must be switched with a good response is carried out by the third solenoid valve $16_3$, the following arrangement has been employed in this embodiment. Namely, the second and the third solenoid vales $16_2$, $16_3$ are respectively formed by a three-way valve and, in view of the space, only the first solenoid valve $16_1$ is constituted by a small-sized two-way valve.

At the "$D_4$" position of the manual valve 11, the state of energization or non-energization of the first through the third solenoid valves $16_1$, $16_2$, $16_3$; the position of the first and the second shift valves $12_1$, $12_2$; and the output pressures (pressures in No. 22 and No. 23 oil passages L22, L23) of the first and the second pressure regulating valves $14_1$, $14_2$; at the in-gear time (initial gear engagement), as well as at the first through the fourth speeds are as shown in the table given hereinbelow.

|  | In-gear | 1st speed | 1st ↔ 2nd speed | 2nd speed | 2nd ↔ 3rd speed | 3rd speed | 3rd ↔ 4th speed | 4th speed |
| --- | --- | --- | --- | --- | --- | --- | --- | --- |
| 1st sol. valve ($16_1$) | X | X | ○ | ○ | ○ | ○ | X | X |
| 2nd sol. valve ($16_2$) | ○ | ○ | ○ | ○ | X | X | X | X |
| 3rd sol. valve ($16_3$) | X | ○ | ○ | X | X | ○ | ○ | X |
| 1st shift valve ($12_1$) | Left | Left | Right | Right | Right | Right | Left | Left |
| 2nd shift valve ($12_2$) | Right | Right | Right | Right | Left | Left | Left | Left |

-continued

|  | In-gear | 1st speed | 1st ↔ 2nd speed | 2nd speed | 2nd ↔ 3rd speed | 3rd speed | 3rd ↔ 4th speed | 4th speed |
|---|---|---|---|---|---|---|---|---|
| changeover valve (13) | Left | Right | Right | Left | Left | Right | Right | Left |
| 1st p. reg. valve ($14_1$) | L→H | H | H ↔ L | L | L ↔ H | H | H ↔ L | L |
| 2nd p. reg valve ($14_2$) | H→L | L | L ↔ H | H | H ↔ L | L | L ↔ H | H | sol. valve = solenoid valve; p. reg. valve = pressure regulating valve; L = Low; H = High; ○ = energized; X = not energized In this embodiment, between the first and the second pressure regulating valves $14_1$, $14_2$, the one that functioned as an oil supply pressure regulating valve for boosting the hydraulic pressure in the on-coming hydraulic clutch at the time of the last speed changing will function as an oil discharge pressure regulating valve (i.e., a pressure regulating valve for oil discharge) for dropping or lowering the hydraulic pressure in the off-going hydraulic clutch at the time of the next speed changing. Further, the one that functioned as an oil discharge pressure regulating valve at the time of the last speed changing will function as an oil supply pressure regulating valve (i.e., a pressure regulating valve for oil supply) at the time of the next speed changing. Therefore, the output pressure of each of the pressure regulating valves $14_1$, $14_2$ can be maintained as it is to thereby make it ready for the next speed changing. On the contrary, if one of the first and the second pressure regulating valves $14_1$, $14_2$ is used exclusively for oil supply and the other thereof is used exclusively for oil discharge, the following becomes necessary. Namely, the output pressure of the oil supply pressure regulating valve that was boosted at the time of speed changing must be lowered, and also the output pressure of the oil discharge pressure regulating valve that was lowered at the time of speed changing must be boosted to be prepared for the next speed changing. In this case, if the next speed changing is made at a low temperature within a short period of time, the speed changing will start when the pressure dropping of the output pressure in the oil supply pressure regulating valve or the boosting of the output pressure in the oil discharge pressure regulating valve has not been made sufficiently. As a consequence, the hydraulic pressure control at the time of speed changing gets out of order and speed change shocks are likely to occur. Therefore, it is preferable to use, as in this embodiment, the first and the second pressure regulating valves $14_1$, $14_2$ alternately for oil supplying and for oil discharging at each speed changing.

Figure 4:
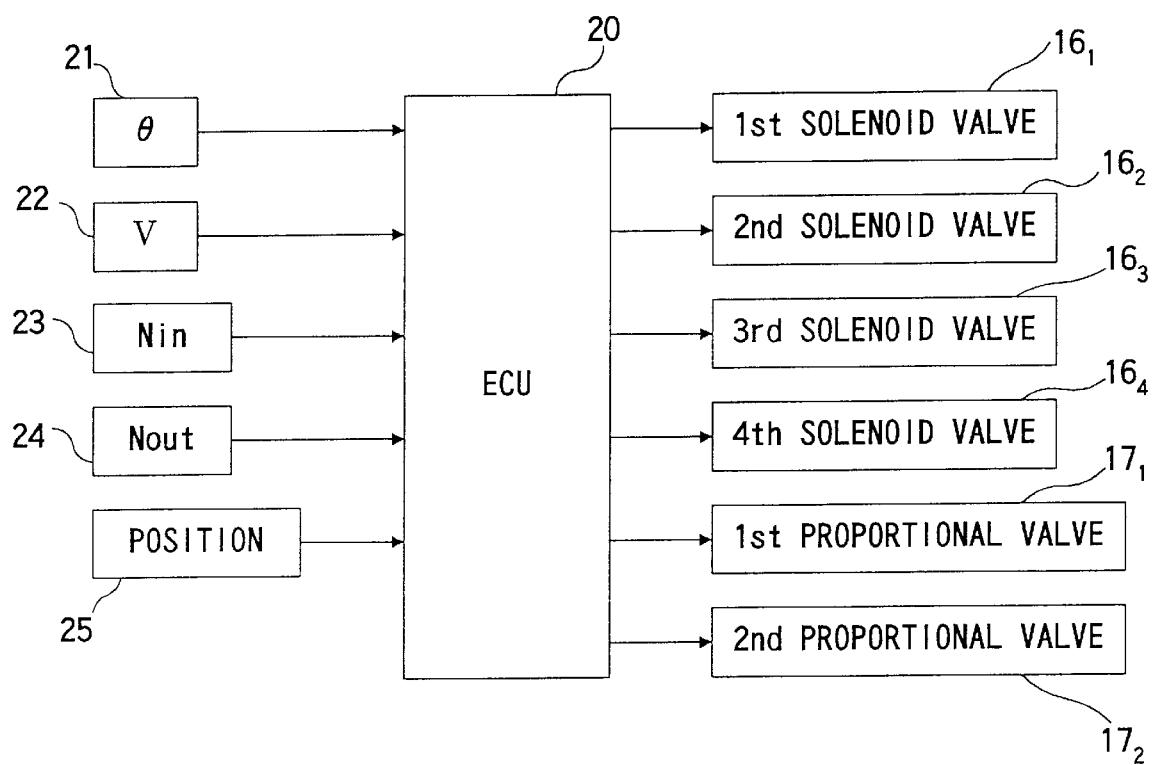
FIG. 4 is a block circuit diagram of a control system for solenoid valves provided in the hydraulic oil circuit.

The first through the third solenoid valves $16_1$, $16_2$, $16_3$ as well as the first and the second solenoid proportional valves $17_1$, $17_2$ are controlled, together with a fourth solenoid valve $16_4$ for a lockup clutch which is described later, by an electronic control unit 20 which is made up of a microcomputer as shown in FIG. 4.

In the electronic control unit (ECU) 20, there are inputted: a signal from a throttle sensor 21 for detecting a throttle opening θ of the engine; a signal from a vehicle speed sensor 22 for detecting the vehicle speed V; a signal from a speed sensor 23 for detecting the rotational speed Nin of the input shaft 3 of the transmission; a signal from a speed sensor 24 for detecting the rotational speed Nout of the output shaft 7 of the transmission; and a signal from a position sensor 25 for the selector lever.

At the "$D_4$" position, a transmission train that suits the present throttle opening θ and the vehicle speed V is selected based on a speed change map for the first through the fourth speeds kept in memory in the ECU 20, thereby carrying out an automatic speed changing of the first through the fourth speeds.

Figure 5:
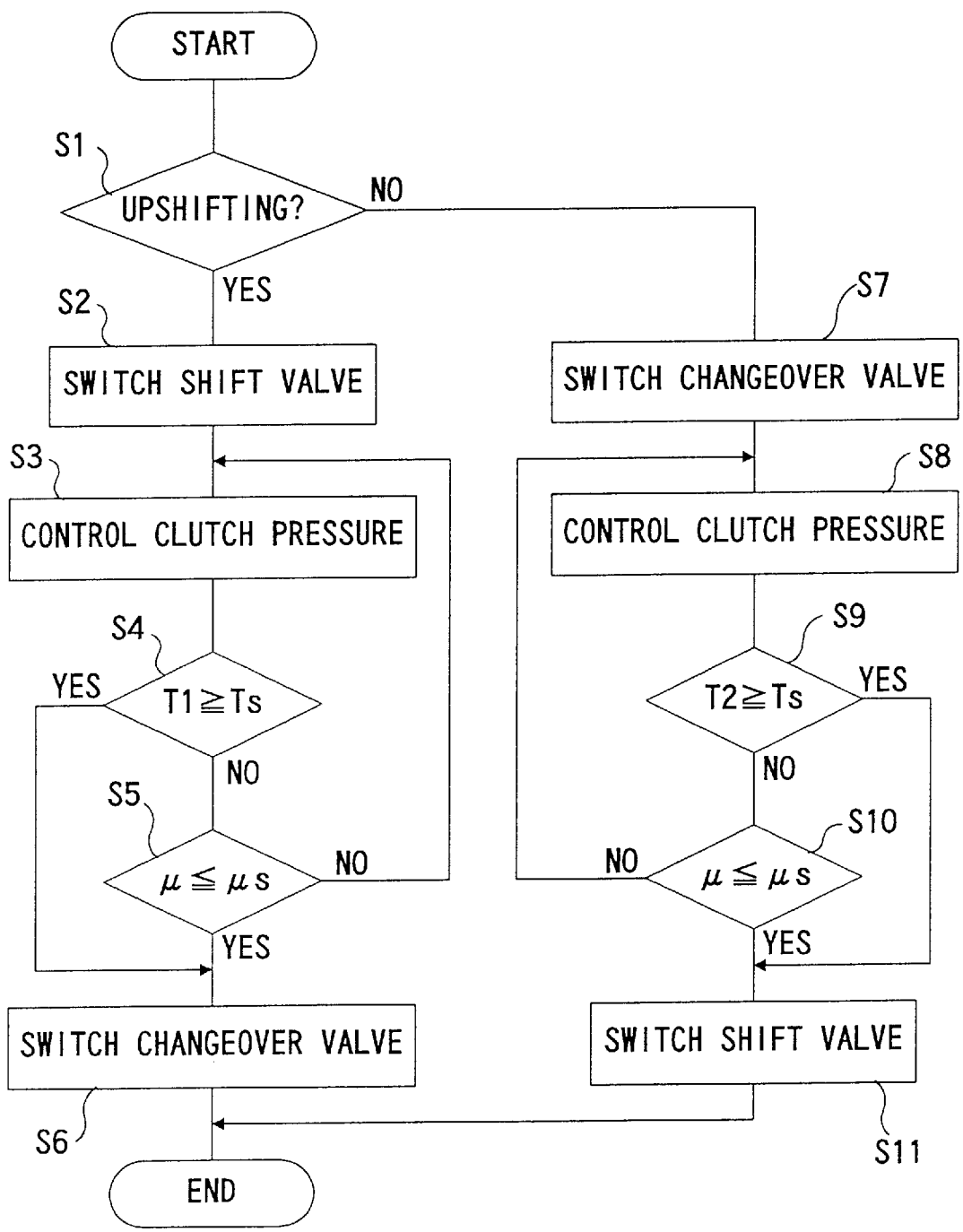
FIG. 5 is a flow chart showing the processing procedures at the time of speed changing.

At the time of speed changing, as shown in FIG. 5, a determination is made as to whether the speed changing is for upshifting or not (S1). If it is for upshifting, the energizing condition of the first and the second solenoid valves $16_1$, $16_2$ is switched to thereby switch the positions of the first and the second shift valves $12_1$, $12_2$ to a condition for carrying out upshifting (S2). Energizing electric current to the first and the second solenoid proportional valves $17_1$, $17_2$ is varied to boost the hydraulic pressure in the on-coming hydraulic clutch, and to lower the hydraulic pressure in the off-going hydraulic clutch (S3). Further, an elapsed time T1 from the point of time of starting the speed changing, i.e., from the time of switching of the first and the second shift valves $12_1$, $12_2$, is measured and a determination is made as to whether T1 has become equal to or above a predetermined time Ts (S4). If T1<Ts, a slip $\mu$ of the on-coming hydraulic engaging element is computed from the Nin, Nout, and a gear ratio of the transmission train to be established by the on-coming hydraulic clutch. A determination is made as to whether the slipping $\mu$ has become equal to or smaller than a predetermined value $\mu$s (S5). Then, when a condition of T1≧Ts or $\mu$≦$\mu$s has been attained, the energizing state of the third solenoid valve $16_3$ is switched to thereby switch the position of the changeover valve 13 to a position different from that of the present position (S6).

In carrying out the downshifting, the position of the changeover valve 13 is switched first (S7). Then, the hydraulic pressure of the on-coming hydraulic clutch is boosted and also the pressure in the hydraulic clutches is lowered (S8). A determination is made as to whether the elapsed time T2 from the time of starting the speed changing, i.e., from the point of time of switching of the changeover valve 13, has become equal to or larger than the predetermined time Ts (S9). If T2<Ts, a determination is made as to whether the slip $\mu$ of the on-coming hydraulic clutch has become equal to or smaller than the predetermined value $\mu$s (S10). When a condition of T2≧Ts or $\mu$≦$\mu$s has been attained, the positions of the first and the second shift valves $12_1$, $12_2$ are switched to the condition for carrying out downshifting (S11).

According to these operations, even if the pressure regulating valves $14_1$, $14_2$ do not function normally due to abnormalities in the solenoid proportional valves $17_1$, $17_2$ whereby the pressure in the on-coming hydraulic clutch is not boosted at the time of speed changing, pressurized oil at the line pressure is supplied to the on-coming hydraulic clutch after the lapse of a predetermined time from the start of the speed changing operation, without passing through the pressure regulating valves $14_1$, $14_2$. Therefore, though some shocks may occur, the speed changing can be surely carried out.

Also at the "$D_3$" position, the same oil circuit arrangement applies as that at the "$D_4$" position. Automatic speed changing of the first through the third speeds is performed based on the speed change map for the first through the third speeds that is stored in the ECU 20.

At the "2" and "1" positions, a stepwise downshifting to the second speed or to the first speed is carried out based on the second speed map or the first speed map that is stored in the ECU 20. Thereafter, the speed is maintained in the second speed or the first speed. At the "2" and "1" positions, No. 21 oil passage L21 that was connected to No. 1 oil passage L1 is opened to atmosphere. The third shift valve $12_3$ can thus become switchable to the right position.

When the third shift valve $12_3$ is switched to the right position, No. 10 oil passage L10 that was connected, in the left position, to the oil discharge port $12_3 b$ is connected to No. 12 oil passage L12. No. 11 oil passage L11 that was connected, in the left position, to No. 12 oil passage L12 is connected to the oil discharge port $12_3 c$ of the third shift valve $12_3$. No. 10 oil passage L10 and No. 11 oil passage L11 are connected, in the right position of the first shift valve $12_1$, to none of the oil passages for the hydraulic clutches. When the first shift valve $12_1$ is moved to the right position, the oil circuit arrangement will become the same as that when the first shift valve $12_1$ is moved to the right position at the "$D_4$" position. Therefore, when both the first and the second shift valves $12_1$, $12_2$ are switched to the right position (a condition of the second speed at the "$D_4$" position), the hydraulic oil is supplied to the second speed hydraulic clutch C2 to thereby establish the second speed transmission gear train G2. When the first shift valve $12_1$ is moved to the right position and the second shift valve $12_2$ is moved to the left position (a condition of the third speed at the "$D_3$ position), the hydraulic oil is supplied to the third speed hydraulic clutch C3 to thereby establish the third speed transmission gear train G3.

On the other hand, when the first shift valve $12_1$ is switched to the left position, No. 14 oil passage L14 for the second speed hydraulic clutch C2 is connected to No. 10 oil passage L10, and No. 17 oil passage L17 for the fourth speed hydraulic clutch C4 is connected to No. 11 oil passage L11, respectively, the oil circuit arrangement will therefore become different from that at the "$D_4$" position. When the first shift valve $12_1$ is moved to the left position and the second shift valve $12_2$ is moved to the right position (a condition of the first speed at the "$D_4$" position), No. 13 oil passage L13 for the first speed hydraulic clutch C1 is connected to No. 4 oil passage L4 (this connection is the same as that at the "$D_4$" position), and No. 14 oil passage L14 for the second speed hydraulic clutch C2 is connected to No. 6 oil passage L6 (at the "$D_4$" position No. 17 oil passage L17 for the fourth speed hydraulic clutch C4 is connected to No. 6 oil passage L6). When both the first and the second shift valves $12_1$, $12_2$ are moved to the left position (a condition of the fourth speed at the "$D_4$" position), No. 15 oil passage L15 for the third speed hydraulic clutch C3 is connected to No. 3 oil passage L3 (this connection is the same as that at the "$D_4$" position). No. 14 oil passage L14 for the second speed hydraulic clutch C2 is connected to No. 5 oil passage L5 (at the "$D_4$" position No. 17 oil passage L17 for the fourth speed hydraulic clutch C4 is connected to No. 5 oil passage L5). No oil supply is therefore made to the fourth speed hydraulic clutch C4.

Here, the third shift valve $12_3$ is arranged to be urged to the left by that output pressure of the second solenoid proportional valve $17_2$ which is inputted via No. 26 oil passage L26. However, when the electric power supply to the first through the third solenoid valves $16_1$, $16_2$, $16_3$ as well as to the first and the second solenoid proportional valves $17_1$, $17_2$ stops at the time of a system failure due to opening of a fuse or the like, both the first and the second shift valves $12_1$, $12_2$ and the changeover valve 13 are switched to the left position, and also the output pressure of the second solenoid proportional valve $17_2$ becomes the atmospheric pressure. The third shift valve $12_3$ is thus switched at the "2" and the "1" positions to the right position and switched, at the "$D_4$" and the "$D_3$" positions, to the left position by the line pressure from No. 21 oil passage L21. Therefore, at the "1" and the "2" positions, the second speed transmission train G2 is established and, at the "$D_4$" and the "$D_3$" positions, the fourth speed transmission gear train G4 is established, respectively. The vehicle is able to run at the second speed and the fourth speed even at the time of the system failure.

At the "R" position of the manual valve 11, No. 2 oil passage L2 is opened to the atmosphere. No. 27 oil passage L27 is connected to No. 1 oil passage L1 and the hydraulic oil is supplied to a first oil chamber 15a on the left end of the servo valve 15 via No. 28 oil passage L28 which is connected to No. 27 oil passage L27 via a first servo control valve 27. According to these operations, the servo valve 15 is urged to the rightward reverse running position to thereby switch the selector gear 8 to the reverse running side. No. 28 oil passage L28 is connected to No. 29 oil passage L29 via that shaft bore 15b of the servo valve 15 which is communicated with the first oil chamber 15a. The oil passage L29 is connected to No. 16 oil passage L16 which is communicated with the fourth speed hydraulic clutch C4 at the "R" position of the manual valve 11. In this manner, the reverse transmission train GR is established by the hydraulic oil supply to the fourth speed hydraulic clutch C4 and by the switching of the selector gear 8 to the reverse running side.

The first servo control valve 27 is urged, by the hydraulic pressure in No. 20 oil passage L20 on the output side of the third solenoid valve $16_3$ and the hydraulic pressure in No. 25 oil passage L25 on the output side of the first solenoid proportional valve $17_1$, to the leftward open side in which No. 27 oil passage L27 and No. 28 oil passage L28 are connected. It is urged by a spring 27a, the hydraulic pressure in No. 2 oil passage L2 and the hydraulic pressure in No. 29 oil passage L29, to the rightward closed side in which the connection between No. 27 oil passage L27 and No. 28 oil passage L28 is shut off and connect No. 28 oil passage L28 to an oil discharge port 27b. At the "$D_4$", "$D_3$", "2" or "1" position, by means of the line pressure to be inputted via No. 2 oil passage L2, the first servo control valve 27 is held in the right position even if the output pressures of the third solenoid valve $16_3$ and the first solenoid proportional valve $17_1$ may both be increased. The oil supply to No. 28 oil passage L28 is thus blocked, and the servo valve 15 is retained in the leftward forward running position by an engaging member 15c, whereby the establishment of the reverse transmission gear train GR is blocked.

Further, when the manual valve 11 is switched to the "R" position while the vehicle is running forwards at a speed above a predetermined speed, the output pressures of both the third solenoid valve $16_3$ and the first solenoid proportional valve $17_1$ are made to be atmospheric pressure. The first servo control valve 27 is thus held in the right position, whereby the hydraulic oil supply to No. 28 oil passage L28, i.e., the establishment of the reverse transmission gear train GR, is blocked.

When the manual valve 11 is switched to the "R" position below a predetermined vehicle speed, the output pressure of the first solenoid proportional valve $17_1$ is gradually increased to thereby urge the first servo control valve 27 to the leftward open side. As described above, the hydraulic oil is supplied to the fourth speed hydraulic clutch C4 via No. 28 oil passage L28, the servo valve 15 and No. 29 oil passage L29. The first servo control valve 27 functions as a pressure regulating valve to thereby control the boosting of the hydraulic pressure in the fourth speed hydraulic clutch C4. Thereafter, the modulator pressure is outputted from the third solenoid valve $16_3$ to thereby urge the first servo control valve 27 to the left endmost position, whereby the hydraulic pressure in the fourth speed hydraulic clutch C4 is maintained at the line pressure. Even if the third solenoid valve $16_3$ fails while it is kept switched on and consequently its output pressure remains in the atmospheric pressure, the hydraulic pressure required to engage the fourth speed hydraulic clutch C4 can be secured by the output pressure of the first solenoid proportional valve $17_1$.

When the manual valve 11 is switched from the "R" position to the "$D_4$", "$D_3$", "2", or "1" position, the line pressure is inputted from No. 30 oil passage L30 which is connected like No. 2 oil passage L2 to No. 1 oil passage L1 at each of the above positions, to a second oil chamber 15d which is present in an intermediate position of the servo valve 15 via the second servo control valve 28 and No. 31 oil passage L31. The servo valve 15 is thus moved to the left and is switched to the forward running position.

The second servo control valve 28 is urged, by the first speed pressure to be inputted via No. 13 oil passage L13, the output pressure of the second solenoid valve $16_2$ to be inputted via No. 19 oil passage L19, and the output pressure of the second pressure regulating valve $14_2$ to be inputted via No. 23 oil passage L23, to the left position in which No. 30 oil passage L30 and No. 31 oil passage L31 are connected. It is urged by a spring 28a and the hydraulic pressure in No. 27 oil passage L27 to the right position in which the connection between No. 30 and No. 31 oil passages L30, L31 is shut off and No. 31 oil passage L31 is connected to an oil discharge port 28b.

In this manner, at the "R" position, the second servo control valve 28 is surely switched to the right position by the line pressure from No. 27 oil passage L27. After switching the manual valve 11 to the "$D_4$", "$D_3$", "2"or "1" position, the second servo control valve 28 is maintained in the right position until the first speed pressure rises to a predetermined value. The inputting of the line pressure to the second oil chamber 15d is thus blocked and the servo valve 15 is retained by an engaging means 15c in the reverse running position. When the first speed pressure has become a predetermined value or above, the second servo control valve 28 is switched to the left position, and the line pressure is inputted to the second oil chamber 15d to thereby switch the servo valve 15 to the forward running position. Therefore, even if the manual valve 11 is switched from the "R" position to the "$D_4$", "$D_3$", "2" or "1" position in a condition in which an accelerator pedal is stepped, the rotation in the reverse direction of the output shaft 7 is being restrained, at the time of switching of the servo valve 15, by a torque transmission in the forward (or positive) direction of rotation via the first speed transmission gear train G1 due to a rise in the first speed pressure. Consequently, the selector gear 8 and a driven gear G4a of the fourth speed transmission gear train G4 can smoothly be engaged in a condition in which no large relative rotation occurs. Wear of the meshing (or engaging) portions of both the gears 8, G4a can thus be prevented.

In case of an occurrence of an abnormality in that the second servo control valve 28 is locked in the right position due to an inclusion of a foreign matter or the like, or else the servo valve 15 is locked in the reverse running position even after the servo control valve 28 has been switched to the left position, the selector gear 8 will remain in the reverse running position even if the manual valve 11 is switched from the "R" position to the "$D_4$", "$D_3$", "2" or "1" position. If the hydraulic oil is consequently supplied to the fourth speed hydraulic clutch C4, the reverse transmission gear train GR will thus be established. As a solution, in this embodiment, there are provided No. 32 oil passage L32 which is in communication with the left end oil chamber of the third shift valve $12_3$, and No. 33 oil passage L33 which is connected, in the reverse running position of the servo valve 15, to the second oil chamber 15d of the servo valve 15 via a notched groove 15e. It is thus so arranged that No. 32 oil passage L32 can be connected to No. 30 oil passage L30 at the right position of the second servo valve 28 and to No. 33 oil passage L33 at the left position of the second servo valve 28, respectively. According to this arrangement, when the above-described abnormality should occur, the line pressure is inputted to the left end oil chamber of the third shift valve $12_3$ via No. 32 oil passage L32. Therefore, the third shift valve $12_3$ is switched and held in the right position regardless of the hydraulic pressures in No. 21 oil passage L21 and No. 26 oil passage L26 which both urge the third shift valve $12_3$ leftwards, whereby the hydraulic oil supply to the fourth speed hydraulic clutch C4 is blocked.

Once switched to the left position, the second servo valve 28 is held in the left position by a self-locking force to be generated by a difference in the pressure-receiving area between right and left lands of an annular groove 28c which connects No. 30 oil passage L30 and No. 31 oil passage L31 together. In case, however, the oil level largely varies due to a sudden cornering whereby the hydraulic pressure from the hydraulic pressure source 10 instantly stops or disappears, the second servo control valve 28 may be switched to right position by the force of the spring 28a. In such a case, if the second servo control valve 28 is arranged to be urged leftwards only by the first speed pressure, the second servo control valve 28 will no longer be returned, at the second through the fourth speeds, to the left position even when the hydraulic pressure restores. As a solution, in this embodiment, the second servo control valve 28 is urged to the left position also by the output pressure of the second pressure regulating valve $14_2$ that becomes high at the second and the fourth speeds, as well as by the output pressure of the second solenoid valve $16_2$ that becomes high at the third and the fourth speeds. At the first through the third speeds, even if the second servo control valve 28 does not return to the left position and the third shift valve $12_3$ is switched to the right position by the input of the line pressure from No. 32 oil passage L32, the oil supply to, and discharge from, each of the hydraulic clutches C1 through C4 are not affected. However, at the fourth speed, the hydraulic oil is supplied to the second speed hydraulic clutch C2 and, consequently, the speed is downshifted from the fourth speed to the second speed. Therefore, at the fourth speed, the second servo control valve 28 is urged leftwards by the output pressure of the second pressure regulating valve $14_2$ and the output pressure of the second solenoid valve $16_2$. Thus, even if one of the output pressures does not rise to a normal value after the restoration of the hydraulic pressure, the second servo control valve 28 is arranged to be surely switched to the left position.

At the "N" position of the manual valve 11, No. 2 oil passage L2, No. 16 oil passage L16, No. 17 oil passage L17, No. 27 oil passage L27, No. 29 oil passage L29, and No. 30 oil passage L30 are all opened to atmosphere, and all of the hydraulic clutches C1 through C4 are disengaged. Further, at the "P" position, No. 27 oil passage L27 is connected to No. 1 oil passage L1, and the servo valve 15 is switched to the reverse running position by the inputting of the line pressure via the first servo control valve 27 and No. 28 oil passage L28. At the "P" position, however, the connection between No. 16 oil passage L16 and No. 29 oil passage L29 is shut off to thereby open No. 16 oil passage L16 to atmosphere. There is therefore no possibility that the reverse transmission gear train GR is established.

The fluid torque converter 2 contains therein a lock-up clutch 2a. In the hydraulic oil circuit there is provided a lock-up control portion 29 for controlling the operation of the lock-up clutch 2a with the hydraulic oil to be supplied from the regulator 18 via No. 34 oil passage L34 operating as the working oil.

The lock-up control portion 29 is made up of: a shift valve 30 which controls on and off switching of the lock-up clutch 2a; a changeover valve 31 which switches the engaged condition of the lock-up clutch 2a at the time of being switched on between a locked up condition in which no slipping occurs and a slipping condition; and a pressure regulating valve 32 which controls the increase or decrease of the engaging force in the slipping condition.

The shift valve 30 is switchable between the following two positions, i.e.: a right position in which No. 34 oil passage L34 is connected to No. 35 oil passage L35 which is communicated with a backpressure chamber of the lock-up clutch 2a and in which No. 36 oil passage L36 which is communicated with an internal space of the fluid torque converter 2 is connected, via a throttled portion 30a, to No. 37 oil passage L37 for oil discharge; and a left position in which No. 34 oil passage L34 is connected to No. 38 oil passage L38 which is communicated with the changeover valve 31 and also to No. 36 oil passage L36 via the throttled portion 30a, and in which No. 35 oil passage L35 is connected to No. 39 oil passage L39 which is communicated with the pressure regulating valve 32. The shift valve 30 is controlled by the fourth solenoid valve $16_4$. The fourth solenoid valve $16_4$ is constituted by a two-way valve which opens to atmosphere No. 40 oil passage L40 which is connected to No. 24 oil passage L24 on the output side of the modulator valve 19 via a throttle $16_4a$. The shift valve 30 is urged to the left position by the hydraulic pressure in No. 24 oil passage L24, i.e., by the modulator pressure, and is urged to the right position by a spring 30b and the hydraulic pressure in No. 40 oil passage L40. When the fourth solenoid valve $16_4$ is closed and the hydraulic pressure in No. 40 oil passage L40 is boosted to the modulator pressure, the shift valve 30 is switched to the right position. When the fourth solenoid valve $16_4$ is opened and the hydraulic pressure in No. 40 oil passage L40 is lowered to the atmospheric pressure, the shift valve 30 is switched to the left position.

The changeover valve 31 is switchable between the following two positions, i.e., a right position in which No. 41 oil passage L41 which is communicated with the internal space of the fluid torque converter 2 is connected to No. 42 oil passage L42 which is communicated with a left end oil chamber of the pressure regulator valve 32, and a left position in which No. 42 oil passage L42 is opened to atmosphere and in which No. 38 oil passage L38 is connected to No. 36 oil passage L36. The changeover valve 31 is urged to the right position by a spring 31a and is urged to the left position by the hydraulic pressure in No. 43 oil passage L43 which is connected to the right-end oil chamber.

The pressure regulating valve 32 is switchable between the following two positions, i.e., a right position in which No. 39 oil passage L39 is connected to No. 34 oil passage L34 and in which No. 41 oil passage L41 is connected to No. 37 oil passage L37 via a throttle 32a, and a left position in which the connection between No. 39 oil passage L39 and No. 34 oil passage L34 is shut off and connect No. 39 oil passage L39 to a throttled oil discharge port 32b, and in which the connection between No. 41 oil passage L41 and No. 37 oil passage L37 is shut off. The pressure regulating valve 32 is urged rightwards by a spring 32c and the hydraulic pressure in No. 42 oil passage L42, and is urged leftwards by the hydraulic pressure in No. 39 oil passage L39 and the hydraulic pressure in No. 43 oil passage L43. Here, let the pressure receiving area receiving the hydraulic pressure in No. 39 oil passage L39 and the pressure receiving area receiving the hydraulic pressure in No. 42 oil passage L42 be both s1, the pressure receiving area to receive the hydraulic pressure in No. 43 oil passage L43 be s2, the hydraulic pressures in No. 39 oil passage L39, No. 42 oil passage L42 and No. 43 oil passage L43 be Pa, Pb and Pc, respectively, and the urging force of the spring 32c be F. Then, we have $$s1 \cdot Pb + F = s1 \cdot Pa + s2 \cdot Pc$$

$$Pb - Pa = (s2 \cdot Pc - F)/s1$$

The differential pressure between the hydraulic pressure in No. 42 oil passage L42 and the hydraulic pressure in No. 39 oil passage L39 is increased or decreased depending on the hydraulic pressure in No. 43 oil passage L43.

No. 43 oil passage L43 is connected, at the right position of the changeover valve 13, to No. 25 oil passage L25 on the output side of the first solenoid proportional valve $17_1$ and, at the left position of the changeover valve 13, to No. 26 oil passage L26 on the output side of the second solenoid proportional valve $17_2$. In this manner, the changeover valve 31 and the pressure regulating valve 32 are controlled by the first solenoid proportional valve $17_1$ at the time of the first and the third speeds in which the changeover valve 13 is in the right position, and by the second solenoid proportional valve $17_2$ at the time of the second and the fourth speeds in which the changeover valve 13 is in the left position.

When the shift valve 30 is in the right position, the working oil from No. 34 oil passage L34 is supplied to the back pressure chamber of the lock-up clutch 2a via the shift valve 30 and No. 35 oil passage L35. Also, the internal space of the fluid toque converter 2 is connected to No. 37 oil passage L37 via No. 41 oil passage L41 and the pressure regulating valve 32 as well as via No. 36 oil passage L36 and the throttled portion 30a of the shift valve 30. Due to the oil discharge from the internal space via No. 37 oil passage L37, the internal pressure in the internal space is lowered, whereby the lock-up clutch 2a becomes a condition of being switched off, i.e., in a condition in which the engagement is released.

When the shift valve 30 is switched to the left position, the back pressure chamber of the lock-up clutch 2a is connected to No. 39 oil passage L39 via No. 35 oil passage L35 and the shift valve 30. While the changeover valve 31 is in the right position, the internal space of the fluid torque converter 2 is connected to No. 34 oil passage L34 via No. 36 oil passage L36 and the throttled portion 30a of the shift valve 30, as well as to No. 42 oil passage L42 via No. 41 oil passage L41 and the changeover valve 31. The differential pressure between the internal pressure in the internal space and the internal pressure in the back pressure chamber can be controlled for increase or decrease by that hydraulic pressure in No. 43 oil passage L43 which is inputted to the pressure regulating valve 32. In this manner, the lock-up clutch 2a is engaged, in a slipping condition, with an engaging force corresponding to the output pressure of the first solenoid proportional valve $17_1$ or the second solenoid proportional valve $17_2$.

When the hydraulic pressure in No. 43 oil passage L43 has become a predetermined value and above whereby the changeover valve 31 is switched to the left position, No. 42 oil passage L42 is opened to atmosphere and consequently the pressure regulating valve 32 is switched to, and retained in, the left position. The back pressure chamber of the lock-up clutch 2a thus remains connected to the oil discharge port 32b of the pressure regulating valve 32 via No. 35 oil passage L35, the shift valve 30, and No. 39 oil passage L39. On the other hand, the hydraulic oil is supplied from No. 34 oil passage L34 to the internal space of the fluid torque converter 2 via the shift valve 30, No. 38 oil passage L38, the changeover valve 31, and No. 36 oil passage L36. Further, since the connection between No. 41 oil passage L41 and No. 37 oil passage L37 is shut off by the switching of the pressure regulating valve 32 to the left position, the internal pressure inside the internal space is maintained at a relatively high pressure that is set by a check valve 33 which is connected to No. 41 oil passage L41. The lock-up clutch 2a is thus engaged in the locked up condition.

In the figure, numeral 34 denotes an oil cooler interposed in No. 37 oil passage L37, numeral 35 denotes a check valve for the oil cooler, numeral 36 denotes a throttle member which is interposed in a lubricating oil passage LB which supplies oil leaked from the regulator 18 to lubricated portions in each of the shafts 3, 5, 7 of the transmission.

Explanations have so far been made about an embodiment in which the present invention is applied to a control apparatus of a parallel shaft type of transmission. The present invention can also be applied to a control apparatus of a planetary type of transmission. In the planetary type of transmission, the speed changing is sometimes made by engaging another hydraulic engaging element while one hydraulic engaging element is kept engaged. In this case, the boosting at the time of speed changing of said another hydraulic engaging element to be newly engaged is controlled by a pressure regulating valve. After completion of the speed changing, pressurized oil at a line pressure is supplied to said another hydraulic engaging element without passing through the pressure regulating valve.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically-operated vehicular transmission having hydraulic engaging elements, comprising:

an oil supply pressure regulating valve for controlling pressure rise characteristics of a hydraulic pressure during speed changing in an on-coming hydraulic engaging element;

an oil discharge pressure regulating valve for controlling pressure drop characteristics of a hydraulic pressure during speed changing in an off-going hydraulic engaging element; and changeover means for switching a connection of oil passages such that, after completion of the speed changing operation, hydraulic oil pressurized at line pressure is supplied to said on-coming hydraulic engaging element without passing through said oil supply pressure regulating valve, and that hydraulic oil is discharged from said off-going hydraulic engaging element without passing through said oil discharge pressure regulating valve, wherein a first pressure regulating valve and a second pressure regulating valve function as said oil supply pressure regulating valve and said oil discharge pressure regulating valve, wherein said changeover means comprises both a changeover valve and a shift valve unit, and wherein said changeover valve is switchable between a first and a second switchover position and, at speed changing of one of upshifting and downshifting, said changeover valve is switched from one switchover position that said changeover valve was in prior to speed changing to the other switchover position after completion of said speed changing and, at speed changing of the other of upshifting and downshifting, said changeover valve is switched from one switchover position that said changeover valve was in prior to speed changing to the other switchover position during speed changing;

said control apparatus further comprising:

a first connecting oil passage to be connected, at said first switchover position of said changeover valve, to a first pressure-regulated oil passage whose pressure is regulated by said first pressure regulating valve;

a second connecting oil passage to be connected to said first pressure-regulated oil passage at said second switchover position of said changeover valve, wherein said first connecting oil passage is connected at said second switchover position to an oil discharge passage and said second connecting oil passage is connected at said first switchover position to an oil passage at line pressure;

a third connecting oil passage to be connected, at said first switchover position of said changeover valve, to a second pressure-regulated oil passage whose pressure is regulated by said second pressure regulating valve; and a fourth connecting oil passage to be connected to said second pressure regulated oil passage at said second switchover position of said changeover valve, wherein said third connecting oil passage is connected at said second switchover position to the oil passage at line pressure and said fourth connecting oil passage is connected at said first switchover position to the oil discharge passage;

wherein said shift valve unit operates:

to connect, at speed changing in which said changeover valve is switched from said first switchover position to said second switchover position after completion of speed changing, said off-going hydraulic engaging element to said first connecting oil passage and said on-coming hydraulic engaging element to said third connecting oil passage, respectively, during speed changing;

to connect, at speed changing in which said changeover valve is switched from said second switchover position to said first switchover position after completion of speed changing, said off-going hydraulic engaging element to said fourth connecting oil passage and said on-coming hydraulic engaging element to said second connecting oil passage, respectively, during speed changing;

to connect, at speed changing in which said changeover valve is switched at speed changing from said first switchover position to said second switchover position, said off-going hydraulic engaging element to the oil discharge passage and said on-coming hydraulic engaging element to said third connecting oil passage, respectively, after completion of speed changing; and to connect, at speed changing in which said changeover valve is switched at speed changing from said second switchover position to said first switchover position, said off-going hydraulic engaging element to the oil discharge passage and said on-coming hydraulic engaging element to said second connecting oil passage, respectively, after completion of speed changing.

2. A control apparatus for a hydraulically-operated vehicular transmission according to claim 1, further comprising at least four transmission gear trains for first through fourth speeds to be selectively established by respective hydraulic engaging elements, wherein said changeover valve is switched and held in said first switchover position at first and third speeds and is held in said second switchover position at second and fourth speeds;

wherein said shift valve unit operates:

to connect, at first speed, a first speed hydraulic engaging element for establishing a first speed transmission gear train to said second connecting oil passage;

to connect, at second speed, said first speed hydraulic engaging element to said first connecting oil passage and a second speed hydraulic engaging element for establishing a second speed transmission gear train to said third connecting oil passage, respectively;

to connect, at third speed, said second speed hydraulic engaging element to said fourth connecting oil passage and a third speed hydraulic engaging element for establishing a third speed transmission gear train to said second connecting oil passage, respectively; and to connect, at fourth speed, said third speed hydraulic engaging element to said first connecting oil passage and a fourth speed hydraulic engaging element for establishing a fourth speed transmission gear train to said third connecting oil passage, respectively.

3. A control apparatus for a hydraulically operated vehicular transmission according to claim 1, wherein switching of connecting oil passages by said changeover means after completion of speed changing is carried out when slipping of said on-coming hydraulic engaging element has fallen below a predetermined value.

4. A control apparatus for a hydraulically operated vehicular transmission according to claim 1, wherein switching of connecting oil passages by said changeover means after completion of the speed changing operation is carried out after a predetermined elapsed time period from a start of the speed changing operation.

5. A control apparatus for a hydraulically operated vehicular transmission according to claim 1, wherein switching of connecting oil passages by said changeover means is performed when one of following conditions is satisfied, said conditions being that slipping of said on-coming hydraulic engaging element has fallen below a predetermined value and that an elapsed time from a start of the speed changing operation is greater than a predetermined time period.

* * * * *